RECIRCULATING SYSTEM FOR FLOWABLE MATERIALS

Original Filed April 28, 1967 2 Sheets-Sheet 1

INVENTOR
RICHARD F. WIGGINS

BY Mendeville & Schweitzer
ATTORNEYS

RECIRCULATING SYSTEM FOR FLOWABLE MATERIALS

Original Filed April 28, 1967 2 Sheets-Sheet 2

United States Patent Office

Re. 27,058
Reissued Feb. 16, 1971

27,058
RECIRCULATING SYSTEM FOR FLOWABLE MATERIALS

Richard F. Wiggins, Fairfield, Conn., assignor to The Gyromat Corporation, Stratford, Conn., a corporation of Connecticut Original No. 3,424,125, dated Jan. 28, 1969, Ser. No. 634,725, Apr. 28, 1967. Application for reissue Aug. 26, 1969, Ser. No. 869,969
Int. Cl. B05c *11/10*
U.S. Cl. 118—7 12 Claims

Matter enclosed in heavy brackets [ ] appears in the original patent but forms no part of this reissue specification; matter printed in italics indicates the additions made by reissue.

ABSTRACT OF THE DISCLOSURE

A system for automatically and continuously supplying and recirculating a normally flowable material to a pneumatic spray gun station and for automatically replenishing the flowable, sprayable material as it is consumed.

BACKGROUND OF THE INVENTION

In conventional recirculating spray systems, at least one and often several pumps are included in a spray supply circuit for moving the spray medium to and/or from a supply tank or source. While these conventional systems have usually proved effective for handling conventional, pumpable spray media, certain coatings, which are desirably applicable by spray techniques, may be handled to greater advantage without pumping while certain other coatings are non-pumpable and may not be used at all in conventional systems. The non-pumpability of these media is typically occasioned by the deleterious effects of the pumping action on the physical properties of the spray material, itself, or conversely by the deleterious effects of the spray material on the pump apparatus.

Accordingly, when non-pumpable material is required to be sprayed, specially designed handling and recirculating systems must be provided. It is to a new and improved materials handling and recirculating system for any flowable substances, and more particularly non-pumpable substances, e.g., a tetrafluoroethylene solution or an emulsion, that the present invention is specifically directed.

SUMMARY OF THE INVENTION

In accordance with the present invention, a non-pumpable liquid spray medium may be continuously recirculated and supplied to a spray gun by employing at least two tanks, one of which is pneumatically pressurized and serves as a supply tank and the other of which is non-pressurized and serves as a recovery tank, and, periodically, without process interruption, by reversing the pressurization and the function of the two tanks. As an important aspect of the invention, automatic controls are provided to ensure that during the reversal of the tank functions, the spray medium is continuously and effectively supplied to the spray guns under positive pressure. To that end, the overspray is collected in a tank which is separate from the supply tank, and the overspray, itself, is periodically recirculated to the spray gun by pressurizing the recovery tank to convert it temporarily to a supply tank and correspondingly depressurizing the supply tank to convert it temporarily to a recovery tank.

In accordance with another specific aspect of the invention, a third or replenish tank may be provided, which tank includes control apparatus for automatically introducing spray medium into the recirculating system upon the exhausting of predetermined amounts of spray medium therefrom.

Specifically, a typical recirculating system for a flowable spray medium embodying the inventive concepts includes a pneumatic spray gun which is alternately fed from one of the aforementioned dual-functioning tanks, an overspray chamber beyond and in line with the spray guns into which chamber overspray is directed, and gravity return lines, including selectively actuatable valving, leading from the chamber into each of said dual-functioning tanks. As will be understood, the flowable medium is forced under pressure from the tank which is functioning as the supply tank to a spray gun where it is sprayed onto an article in the spray chamber with the overspray being collected in the collection chamber and flowing by gravity into the non-pressurized recovery tank where it accumulates. When the supply tank supplying the guns is substantially depleted of spray medium and the recovery tank collecting the overspray is substantially full, the pressurization and functions of the tanks are automatically reversed to convert the tank which has been acting as a pressurized supply tank into a non-pressurized recovery tank. The "flip-flop" operation enables a flowable liquid medium to be continuously recirculated in a spray system in a highly efficient manner.

In accordance with one aspect of the invention, during the reversal of tank functions, both dual-functioning tanks are pressurized in order to supply the spray gun without any interruption whatever. That is to say, when the recovery tank is converted to a supply tank, the original supply tank is maintained under pressure to continue the supply of spray medium to the spray gun while the recovery tank is being pressurized. When the recovery tank is fully pressurized and is itself supplying the spray gun (i.e., its conversion is completed), the original supply tank is depressurized to adapt it for overspray recovery.

DESCRIPTION OF THE DRAWINGS

For a more complete understanding of the present invention, reference should be made to the following detailed description taken in conjunction with the accompanying drawing, in which.

DESCRIPTION OF THE PREFERRED EMBODIMENT

Figure 1:
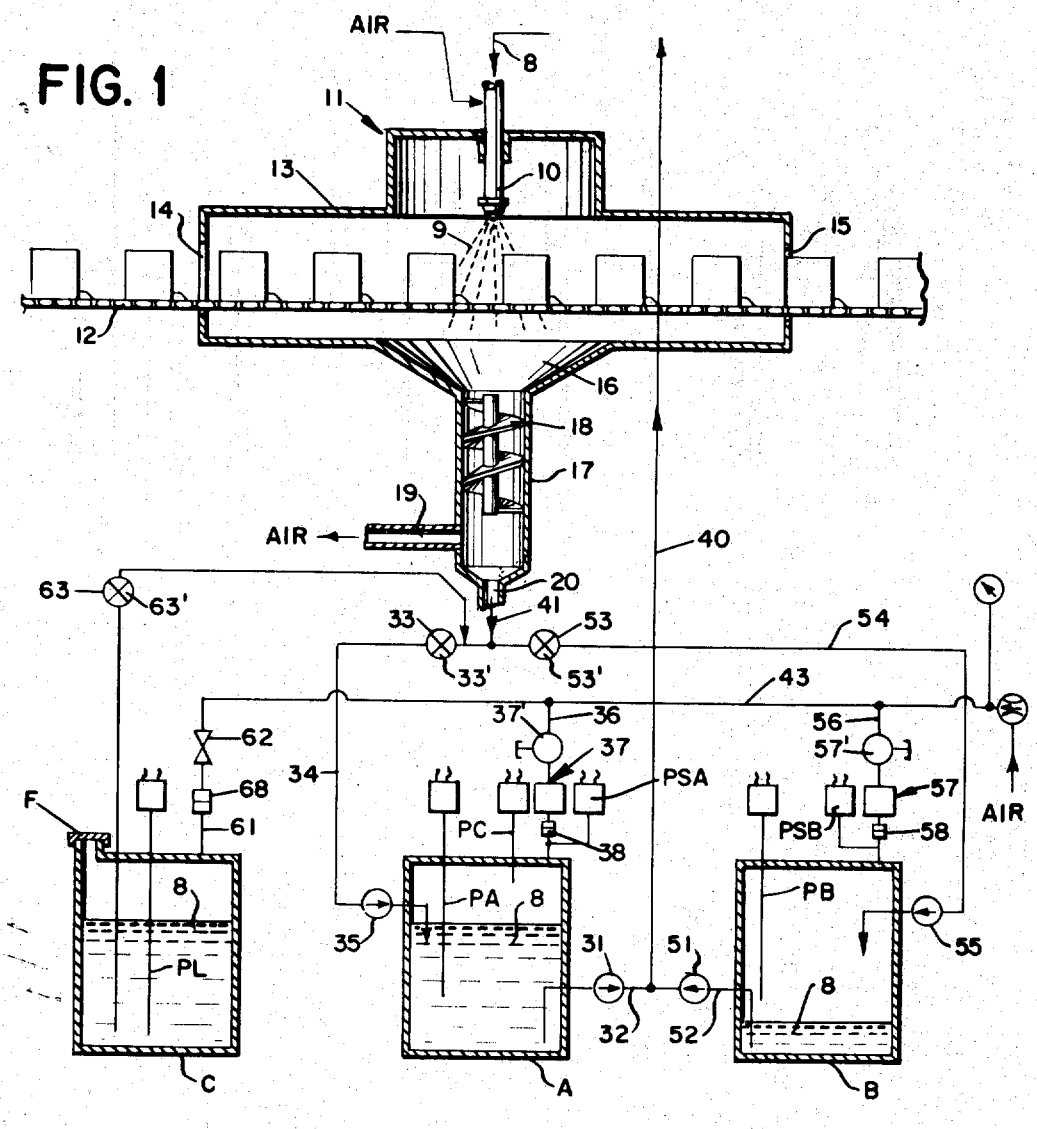
FIG. 1 is a schematic representation of a recirculating system for a flowable spray medium embodying the inventive principles.

With reference to FIG. 1, the new and improved system includes a pneumatic spray gun 10 supported in a spray station 11 through which a conveyor belt 12 travels. The spray station includes a generally closed chamber 13 having an entrance 14 and exit 15, a funnel-shaped recovery trough 16 and a cylindrical separator unit 17. As shown, the separator 17 has a helical plate 18 disposed axially therein and includes an air outlet 19 and a recovered spray medium outlet 20. As the overspray traverses the separator, the air-entrained spray particles are condensed on the separator walls, which are continuously wetted by flowing liquid overspray. The entrained spray particles are thus removed from the air stream and returned to the liquid phase.

In accordance with the invention, the spray gun 10 is supplied with a normally flowable spray medium 8, e.g., an emulsion or a solution of Teflon (tetrafluoroethylene) or any solvent solution which would tend to attack a pump or its packing from one of two dual-functioning tanks A, B, through a common supply line 40, by pressurizing the same. Pressurized air is also supplied to the gun 10 to form the medium 8 into an atomized mist 9.

The pressurized tank, initially tank A, will thus initially constitute a supply tank. The other tank, initially tank B, in accordance with the invention, will be left unpressurized in order to collect the condensed overspray by gravity feed through a common return line 41.

The tank A is connected to the common supply line 40 through a check valve 31 by a separate supply line 32 and is connected to the common return line 41 through a solenoid actuated paint valve 33, a separate return line 34, and a check valve 35. Similarly, the tank B is connected to the common supply line 40 through a check valve 51 by a separate supply line 52 and is connected to the common return line 41 through a solenoid actuated paint valve 53, a separate return line 54, and a check valve 55. It should be understood that when the solenoid controlling a specific paint valve (indicated for convenience of description by prime of the reference numeral of the valve) is energized, that paint valve will be opened. Conversely, when the solenoid is de-energized, the paint valve will be closed.

As a specific aspect of the invention, the system includes an additional tank C, a pressurzed replenish tank, which is adapted to introduce spray medium into the closed recirculating system when predetermined amounts of spray medium have been consumed. Specifically, the replenishing tank delivers spray medium to the tank A through a solenoid actuated paint valve 63 and a replenishing line 42.

In accordance with the invention, the normally flowable spray medium 8 is delivered to the spray gun 10 from the tanks, A, B (or to the tank A from the replenish tank C) under positive pneumatic pressure. To this end, compressed air is delivered from a main air line 43 selectively to each of the tanks A-C to effect the pressurization thereof at desired times.

As shown, the replenish tank C has a separate line 61 communicating with the main air line 43 through a cock 62 and a quick-connect coupling 68. It will be understood that, when the recirculating system is in normal operation, the tank C will be maintained in a pressurized condition. The tank A communicates with the main air line 43 through an independent air line 36 in which a three-way solenoid air valve 37 is interposed. Similarly, the tank B communicates with the main air line 43 through an independent air line 56 in which a three-way solenoid air valve 57 is interposed. The air lines 36, 56 include quick-connect couplings 38, 58, respectively, as shown. It should be understood that when the solenoid controlling a specific three-way air valve is energized, that air valve will connect the tank with the compressed air supply to pressurize it and when the solenoid is de-energized the valve will depressurize the tank by connecting it with the atmosphere.

Figure 2:
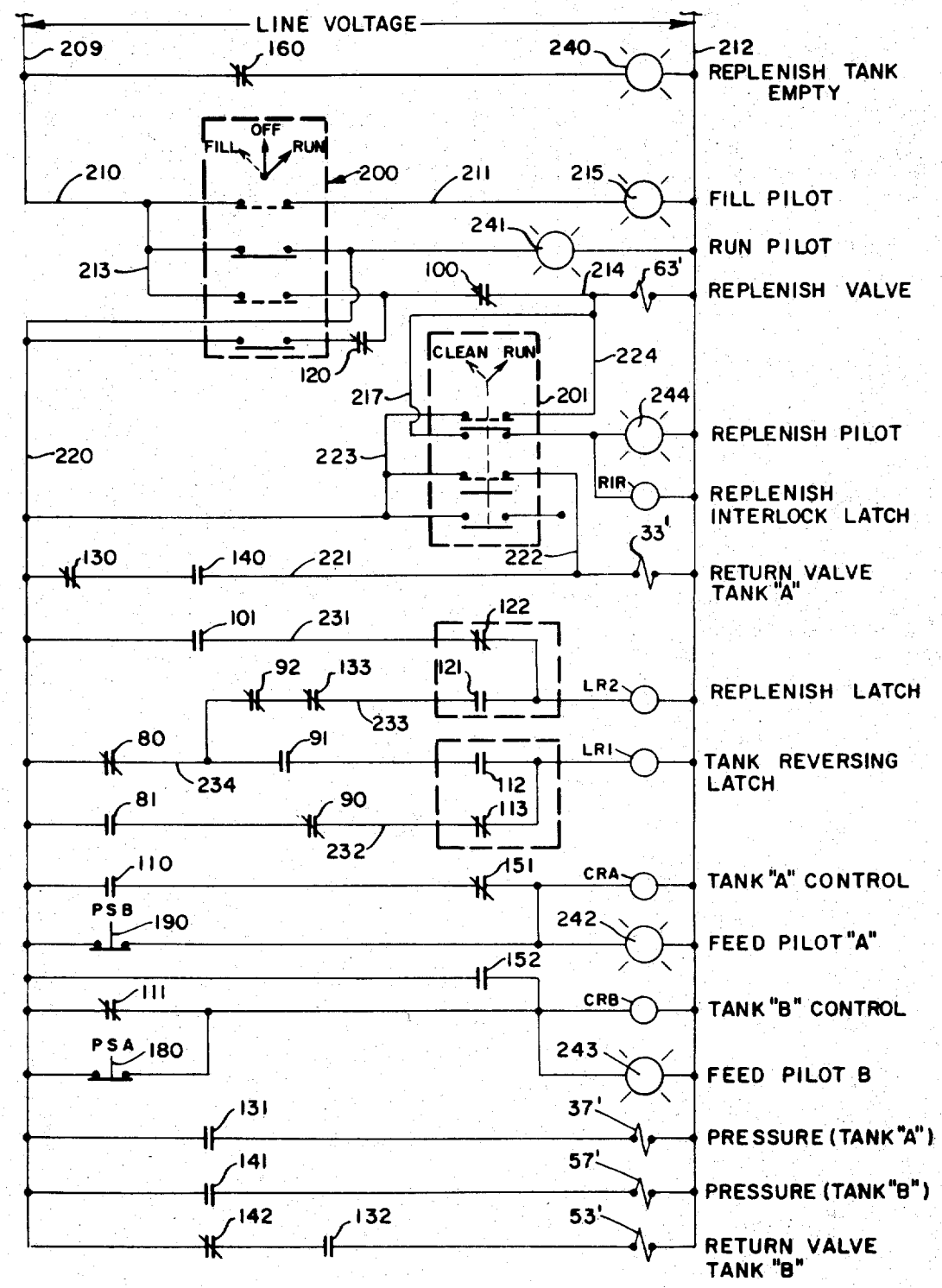
FIG. 2 is a schematic wiring diagram for automatic control of the apparatus of FIG. 1.

As shown in FIG. 1, "tank low" liquid level probes PA, PB each having multiple contact pairs associated therewith, are disposed in the tanks A, B, and pressure switches PSA, PSB are associated with the three-way air valves 37, 57 of tanks A, B, respectively. The pressure switches PSA, PSB each include normally closed contacts 180, 190 which open when the tanks A, B are fully pressurized. Advantageously, the "tank low" control probes PA, PB are disposed at levels corresponding approximately to one-third tank volume. The tank A also has a "tank full" probe PC disposed therein at an upper level, as shown in FIG. 1. In accordance with the invention, and as shown in FIG. 2, these probes and pressure switches are electrically interconnected with the paint valves 33, 53, 63 and the three-way air valves 37, 57 through appropriate replenish interlock (RIR) control (CRA, CRB), and latch (LR1, LR2) relays to supply the spray gun 10 continuously with spray medium 8 from one of the tanks A, B, while collecting the overspray in the other, and from time to time to replenish the spray medium being consumed. The replenish tank C has a liquid level proble PL disposed adjacent its bottom surfaces. The function of this probe is to indicate the need to refill the replenish tank, itself.

More specifically, the tank "low" probe PA has associated therewith a pair of normally closed contacts 80 and a pair of normally open contacts 81. As used hereinafter, normally closed probe contacts are those contacts which are closed when the liquid level in the tank falls below the probe and which contacts are opened when the liquid level rises above the probe. Conversely, normally open probe contacts are those contacts which are closed when the liquid level in the tank rises above the probe and which contacts are opened when the liquid level in the tank falls below the probe. The tank "low" probe PB has two sets of normally closed contacts 90, 92 and one set of normally open contacts 91 associated therewith. The tank "full" probe PC has a set of normally closed contacts 100 and a set of normally open contacts 101 associated therewith. The replenish tank "empty" probe PL has associated therewith a single pair of normally closed contacts 160.

The control system of the invention utilizes two "flip-flop" or bistable relays LR1 and LR2, each of which has a pair of internal normally open contacts and a pair of normally closed contacts. The bistable operation of the bistable latch relays is such that each time the relay is energized the condition of the internal switches is immediately reversed. That is to say, when relay LR2, the replenish latch relay, is energized through its normally open contacts 121, its normally closed contacts 122 will open and vice versa. Likewise, when relay LR1, the tank reversing latch relay, is energized through its normally open contacts 112, its normally closed contacts 113 will open and vice versa. The internally reversible or flip-flop switching of the relays LR1 and LR2 is indicated schematically by enclosing the contacts 121, 122, 112, 113 within dashed lines in FIG. 2. Externally associated with the relay LR1 are normally open contacts 110 and normally closed contacts 111, while normally closed contacts 120 are externally associated with the latch relay LR2.

A single replenish interlock relay RIR is included in the circuitry of FIG. 2 which relay includes a pair of normally open contacts [150,] 152 and a pair of normally closed contacts 151. The operation of the replenish interlock relay is monostable in contrast with the above described bistable operation of the latch relays LR1 and LR2.

Control relay CRA has associated therewith two pairs of normally open contacts 131 and 132 and two pairs of normally closed contacts 130, 133. Control relay CRB has associated therewith a single pair of normally [open] *closed* contacts [141] *142* and two pairs of normally [closed] *open* contacts 140, [152] *141*. Both the control relays CRA and CRB are also monostable in their operation.

A practical wiring diagram for effecting continuous supply and recovery of the spray medium in accordance with the principles of the invention is schematically illustrated in FIG. 2. Specifically, the control system is energized by line voltage through a three position main switch 200. The switch may be selectively thrown from an intermediate "off" position which de-energizes the system, into either the "run" position, which energizes the system in a manner placing it in normal operation, or into a "fill" position, which energizes the system in a manner causig tank A to be filled preparatory to normal operation. Also included in the system is a two position switch 201 which may be thrown from its normally maintained "run" position to a "clean" position in which solenoids 63' and 33' controlling the return valves to the replenish tank C and tank A, respectively, will be energized.

With tanks A, B, empty and replenish tank C full, the system is prepared for operation in the following manner. Switch 200 is thrown into the "fill" position, as shown in FIG. 2, thereby energizing the "fill pilot lamp" 215 through conductors 209, 210, 211, and 212; energizing the replenish solenoid 63' through conductors 210, 213, 214, 212 and the normally closed contacts 100 of the "tank full" probe PC in tank A. Switch 201 is thrown into the "clean" position moving its contacts to the position indicated in phantom, in which position solenoid 33' is placed in parallel with solenoid 63' and energized through conductors 222, 223, 224, and 212.

With solenoids 63', 33' energized, the paint valves 63, 33 for tanks C, A will be opened and spray medium 8 will be forced under pneumatic pressure from tank C into tank A. When the liquid level in tank A has risen to the probe PC, normally closed contacts 100 will open, thereby de-energizing solenoids 63', 33'. The system will then be ready for normal automatic operation and switches 200, 201 are thrown into their "run" positions as illustrated in FIG. 2.

With the switches 200, 201 in the "run" positions, line voltage is placed across conductors 220, 212. At this instant, the liquid level of tank A will be at the level of probe PC. Therefore, the normally open contacts 101 will have closed causing the replenish latch relay LR2 to be energized through conductor 231. The inherent flip-flop operation of the relay LR2, as described hereinabove, will cause the normally open contacts 121 to close and the normally closed contacts 120 to open. Thus, the replenish latch relay LR2 will be set to initiate the automatic replenishing of tank A when the levels in both tanks A, B are below probes PA, PB, as will be explained in detail hereinafter.

With the liquid level in tank A above the probe PA and with the tank B empty, normally open contacts 81 associated with probe PA will be closed and normally closed contacts 90 associated with probe PB will also be closed, thereby causing the tank reversing latch relay LR1 to be energized through conductor 232. This causes the latch LR1 to close contacts 110, to open contacts 111 and to reverse its internal contacts by closing contacts 112 and opening contacts 113. At this point, control relay CRA will be energized through closed contacts 110, the normally closed contacts 151 of the replenish interlock.

The energization of the relay CRA will close the normally open contacts 131 to energize solenoid 37' and simultaneously will close the normally open contacts 132 to energize solenoid 53' through the normally closed contacts 142 associated with control relay CRB. As should be understood and in accordance with the invention, tank A will be pressurized through valve 37 (causing it to function as a supply tank) and tank B will be unpressurized and its paint return valve 53 will be open (causing it to function as a recovery tank).

The spray gun 10 will be fed from tank A and the overspray will be collected in tank B until the liquid level in tank B has risen above probe PB and the level in tank A has fallen below probe PA. At this instant, the latch relay LR1 will be energized through the contacts 91, which will have closed due to the high level of liquid in tank B, and through the contacts 80 which will have closed due to the low liquid level in tank A. This will then cause the contacts 110 to open, the contacts 111 to close, and the internal contacts of the tank reversing relay LR1 to reverse themselves (contacts 112 opening and contacts 113 closing). The reversal of tank functions will have been initiated, as should be understood.

With the contacts 111 closed, control relay CRB is then energized causing contacts 142 to open to de-energize solenoid 53', closing the return valve 53 to tank B and causing contacts 141 to close to energize solenoid 57', starting the pressurization of tank B. However, in accordance with the principles of the invention, while tank B is being pressurized, tank A remains pressurized, in spite of the opening of contacts 110, through the normally closed contacts 190 of pressure switch PSB, which contacts open only when tank B has been brought up to pressure. Thus, in accordance with an important aspect of the invention, the supply to the gun 10 is continuous and uninterrupted.

When tank B has been pressurized, the relay CRA will be de-energized by the opening of the contacts 190 of the pressure switch PSB and the relay CRB will remain energized. At this point, the contacts 130 associated with relay CRA will close causing solenoid 33' to be energized through contacts 130, 140, [and 150] and the reversal of tank functions will have been completed. As will be understood, at this stage of the operational cycle, the paint return valve 33 will be open allowing tank A to function as a recovery tank while tank B will be pressurized allowing it to function as a supply tank.

The supply and recovery functions of tanks A and B will continue to alternate under the control of the latch relay LR1 and the control relays CRA, CRB as long as the liquid level remains above one of the probes PA, PB in the dual-functioning tanks A, B. As explained, during each reversal of tank functions, both paint return valves 33, 53 will be closed and the tank being converted from the supply to the recovery function will remain pressurized until the tank being converted from the recovery to the supply function has been brought up to pressure.

In accordance with an important aspect of the invention, tank A will be automatically replenished without process interruption whenever the liquid level drops below probes PA, PB. As should be understood, when tank A is replenished its paint return valve 33 must be opened and it must be unpressurized, while tank B must be pressurized and continue to supply the gun 10. More specifically, when the foregoing conditions arise, the bistable replenish latch relay LR2 will be energized through probe PA contacts 80, probe PB contacts 92, and control relay CRA contacts 133. This will cause the external latch contacts 120 to close thereby energizing solenoid 63' through probe PC contacts 100 (which will have closed due to the drop in liquid level in tank A) and will cause the replenish paint valve 63 to open, while simultaneously energizing the monostable replenish interlock relay RIR. As explained hereinabove, the relay LR2 is of the inherently bistable type, therefore, its internal contacts 121, 122 will reverse themselves.

During the replenishing of tank A, the liquid level will rise above the low probe PA, a condition which in ordinary operation would cause the relay LR1 to be energized to initiate a reversal of tank pressurization and function through the closing of its contacts 110 and the opening of its contact 111. However, in accordance with the invention, during replenishing the replenish interlock relay contacts 151 will be opened and the interlock contacts 152 will be closed. Thus, the replenish interlock effectively "overrides" the tank reversing latch relay LR1 when tank A is being replenished.

When replenishing is completed by the elevation of the liquid level in tank A above the tank full probe PC, its contacts 100 will be opened closing the replenish valve 63 and its contacts 101 will be closed to "reset" the replenish relay LR2 for the next replenish cycle and to simultaneously de-energize interlock relay RIR by opening contacts 120.

The operation of the system then reverts to the control of relays LR1, CRA, and CRB as described hereinabove, and tank A will become the supply tank while tank B will become the recovery tank. The tanks A and B will periodically reverse their functions until the next replenish cycle is initiated.

When the replenish tank C, itself, becomes low or empty, a "replenish tank empty" pilot lamp 240 will be lighted by the closing of the contacts 160 of replenish probe PL. As will be understood, the replenish tank may then be filled manually through a filler opening F. Additional pilot lamps indicating certain system conditions are included in the control circuitry. As shown in FIG. 2, a "run pilot" lamp 241 will be lighted when the switch 200 is thrown into the run position; a "feed pilot A" lamp 242 will be lighted when tank A is pressurized; a "feed pilot B" lamp 243 will be lighted when tank B is pressurized;

and a "replenish pilot" lamp 244 will be lighted when tank A is being replenished.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A recirculating system for flowable spray media, comprising (a) a first dual-functioning tank;
(b) a second dual-functioning tank;
(c) selectively actuatable means for pressurizing said first and second tanks;
(d) a spray chamber including a spray gun means;
(e) selectively openable supply line means leading from each of said tanks to said spray gun means;
(f) selectively openable return line means leading from said chamber to each of said tanks;
(g) whereby the closing of the return line means to and the pressurizing of one of said tanks allows it to function as a supply tank while the opening of the return line means to the other of said tanks allows it to function as a recovery tank;
(h) control means including flip-flop means to reverse the functions of said tanks by reversing the pressurization of said tanks and by reversing the condition of said supply line means and said return line means associated with said tanks;
(i) said control means including means to maintain a constant flow of spray medium to said spray gun means during the reversal of the functions of said tanks;
(j) whereby spray medium is continuously delivered under pressure to said spray gun by at least one of said tanks when pressurized and spray medium is returned by gravity to one of said tanks when unpressurized.

2. The system of claim 1, which includes (a) a pressurized replenish tank;
(b) a replenish line communicating between said replenish tank and said first tank;
(c) replenish control means adapted to permit flow of spray medium from said replenish tank to said first tank when said first tank is unpressurized and when the level of the medium in both said first and second tanks descends below predetermined levels in each of said tanks.

3. The system of claim 1, in which (a) said return line means include remotely controllable two-way paint valves adjustable between line open and line closed positions;
(b) said supply line means include check valves;
(c) said flip-flop means includes a remotely controllable three-way air valve adjustable between tank pressurizing and tank depressurizing positions;
(d) whereby during reversal of tank functions, the paint valves in both of said return line means are closed and the tank functioning as a supply tank is maintained under pressure until the tank functioning as a recovery tank is pressurized to convert it to a supply tank, at which time the former tank is depressurized and the paint valve associated therewith is opened to convert it into a recovery tank;
(e) said valves being actuated in accordance with the levels of the spray medium in each of said tanks as detected by sensors associated therewith.

4. The system of claim 3, in which (a) all of said valves are electrically controllable;
(b) said first and second tanks each include "tank low" detecting probes;
(c) said flip-flop means is activated whenever the liquid level in one tank is above the probe therein and the liquid level in the other tank is below the probe therein.

5. The system of claim 4, which includes (a) a pressurized replenish tank adapted to refill said first tank whenever said first tank is unpressurized while the liquid levels in said first and second tanks are below said "tank low" probes.

6. The system of claim 5, in which (a) said first tank includes a "tank full" probe disposed in said tank above said "tank low" probe;
(b) said "tank full" probe is adapted to stop the flow of replenishing spray medium from said replenish tank when the spray medium in the first tank has risen to the level of said probe.

7. A system in accordance with claim 6, in which (a) the "tank low" detecting probes are placed at predetermined control levels in said first and second tanks;
(b) the capacity of said tanks at said control levels is approximately two-thirds the total tank volume;
(c) said "tank full" probe is disposed at a predetermined level at which the capacity of said tanks is substantially full.

8. A system in accordance with claim 6, which includes (a) interlock means operatively associated with said flip-flop means to prevent the reversal of tank functions while said first tank is being refilled from said replenish tank.

9. A substantially closed system for supplying a spray gun means with a normally flowable spray medium, and collecting and re-using overspray therefrom, comprising (a) a generally closed spray chamber having spray nozzle means and overspray collection means;
(b) a pair of dual purpose tanks adapted alternatingly to supply spray medium to said gun means and to receive collected overspray from said chamber;
(c) first control means operative to pressurize a first of said tanks and connect it to said nozzle means, and to de-pressurize the second of said tanks and connect it to said overspray collection means; and
(d) second control means operative to pressurize the second tank and connect it to the nozzle means, and to de-pressurize said first tank and connected it to the overspray collection means.

10. The system of claim 9, which includes (a) third control means to maintain the pressurization of one of said tanks during the period in which the other of said tanks is pressurized;
(b) return valve means associated with each of said tanks and being non-communicative with said spray chamber whenever the tank with which it is associated is subjected to pressurization;
(c) said first and second control means include three-way valve means communicative with said spray nozzle means when the tank with which said three-way valve means is associated is pressurized and being communicative with the atmosphere when the tank with which said three-way valve means is associated is unpressurized.

11. The system of claim 9, in which (a) the first and second control means further include low level liquid sensors in each of said tanks responsive to the depletion and accretion of spray medium therein.

12. The system of claim 11, which includes (a) a supply replenishing tank arranger to be filled from time to time with spray medium; and
(b) replenish control means including said first and second control means and operative when the liquid levels in both tanks are simultaneously below said low-level sensors to cause said replenish tank to discharge additional spray medium into said system.

(References on following page)

References Cited

The following references cited by the Examiner, are of record in the patented file of this patent or the original patent.

UNITED STATES PATENTS

| | | | |
|---|---|---|---|
| 2,322,729 | 6/1943 | Holman | 137—209X |
| 2,801,606 | 8/1957 | Hensen | 118—2 |

| | | | |
|---|---|---|---|
| 3,005,417 | 10/1961 | Swaney | 103—238 |
| 3,345,999 | 10/1967 | Boggs | 137—563X |

JOHN P. McINTOSH, Primary Examiner

U.S. Cl. X.R.

118—11, 326